3,658,787
HALOGENATED PURINE NUCLEOSIDES AND DERIVATIVES

Alan F. Russell, Mountain View, Seymour Greenberg, Palo Alto, and John G. Moffatt, Los Altos, Calif., assignors to Syntex Corporation, Panama, Panama
No Drawing. Filed Aug. 4, 1969, Ser. No. 847,414
Int. Cl. C07d 51/54
U.S. Cl. 260—211.5 R
16 Claims

ABSTRACT OF THE DISCLOSURE

Reacting 9-($\beta$-D-ribofuranosyl)-purines with a suitable $\alpha$-acyloxy acyl bromide or chloride followed by hydrolysis of the acylated intermediate yields 9-(3-deoxy-3-halo-$\beta$-D-xylofuranosyl)-purines and 9-(2-deoxy-2-halo-$\beta$-D-arabinofuranosyl)-purines. By varying the process, 9-(3-deoxy-$\beta$-D-ribofuranosyl)-purines, 9-(2-deoxy-$\beta$-D-ribofuranosyl)-purines and 9-(2,3-anhydro-$\beta$-D-ribofuranosyl)-purines can be prepared from the reaction intermediates. These compounds and disclosed derivatives thereof have antibiotic properties and are useful in controlling metabolic processes. The 2',3'-anhydro nucleosides are useful intermediates for preparing compounds having antibiotic properties.

---

This invention relates to halogenated purine nucleosides and to processes for preparing these compounds using $\alpha$-acyloxy acyl halides.

In summary, the halogenated compounds of this invention can be represented by the following general formulas:

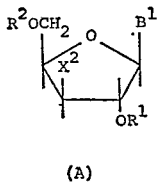
(A)

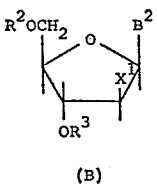
(B)

In the above formulas, $R^1$, $R^2$ and $R^3$ each is hydrogen or a conventional hydrolyzable acyl group;
$B^1$ and $B^2$ each is a purine base or a conventional hydrolyzable acyl derivative thereof, but $B^2$ does not include adenin-9-yl when $X^1$ is chloro, and
$X^1$ and $X^2$ each is chloro or bromo.

The process of this invention for producing compounds having the following general formulas:

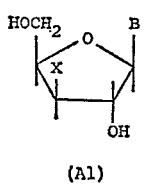
(A1)

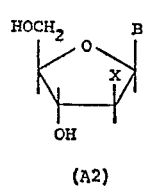
(A2)

wherein
B is a purine base and
X is chloro or bromo comprises reacting in an inert organic solvent a 9-($\beta$-D-ribofuranosyl)-purine with an $\alpha$-acyloxy acyl bromide or chloride having the formula

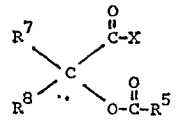
(VIII)

wherein $R^5$ is hydrogen; lower alkyl; or aryl, alkaryl or aralkyl having up to 10 carbons;
$R^7$ is hydrogen; lower alkyl; cycloalkyl having from 3 to 8 carbons; or aryl, alkyl, or aralkyl having up to 10 carbons; and
$R^8$ is lower alkyl or aryl, alkaryl, or aralkyl having up to 10 carbons, $R^8$ being aryl, alkaryl or aralkyl when $R^7$ is hydrogen and hydrolyzing the reaction products.

Other compounds of this invention can be represented by the formulas:

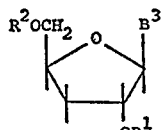
(C)

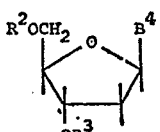
(D)

In the above formulas, $R^1$, $R^2$ and $R^3$ are as previously defined, and
$B^3$ is 7-deazaadenin-9-yl, 7-deazaguanin-9-yl, 6-methylmercaptopurin-9-yl, xanthin-9-yl, 2,6-dichloropurin-9-yl, 2,6-di(methylamino)purin-9-yl, 8-azaadenin-9-yl, 2-fluoroadenin-9-yl, 8-azaguanin-9-yl, 2-azaadenin-9-yl, 2-amino-6-methylmercaptopurin-9-yl, 8-aza-9-deazaadenin-9-yl or 8-aza-9-deazahypoxanthin-9-yl, and
$B^4$ is 2-azaadenin-9-yl 6-methylmercaptopurin-9-yl, 7-deazaadenin-9-yl, 8-aza-9-deazaaden-9-yl or 8-aza-9-deazahypoxanthin-9-yl but when $B^4$ is 2-azaadenin-9-yl, $R^2$ and $R^3$ are hydrogen.

The process of this invention for preparing compounds having the following general formula:

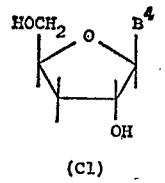
(C1)

wherein $B_4$ is a purine base comprises reacting a 9-($\beta$-D-ribofuranosyl)-purine with an $\alpha$-acyloxy acyl halide of Formula VIII in an inert organic solvent to yield the corresponding 9-(2-O-acyloxy-3-deoxy-3-halo-$\beta$-D-xylofuranosyl)-purine, dehalogenating the product by hydrogenolysis in the presence of a hydrogenation catalyst, and deacylating the dehalogenated product by hydrolysis.

The process of this invention for producing compounds having the following general formula:

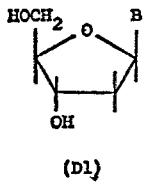

(D1)

wherein B is a purine base comprises reacting a 9-(β-D-ribofuranosyl)-purine with an α-acyloxy acyl halide of Formula VIII in an inert organic solvent, hydrolyzing the reaction products to yield the corresponding 9-(2-deoxy-2-halo-β-D-ribofuranosyl)-purine, and dehalogenating the product by hydrogenolysis in the presence of a hydrogenation catalyst.

The 2',3'-anhydro nucleosides of this invention can be represented by the formula:

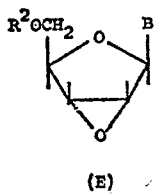

(E)

In the above formula, $R^2$ and B are as previously defined.

The process of this invention for preparing the compounds of Formula E comprises reacting a 9-(β-D-ribofuranosyl)-purine with an α-acyloxy acyl halide of Formula VIII in an inert organic solvent to form the corresponding acylated 9-(3-deoxy-3-halo-β-D-xylofuranosyl)-purine and 9-(2-deoxy-2-halo-β-D-arabinofuranosyl)-purine and dehalogenating the products with an alkali metal alkoxide in an alcoholic solvent.

The term "purine base" as used herein, refers to an unsubstituted or substituted purine, 7-deazapurine or 8-azapurine group wherein the point of attachment to the furanose unit is through the 9-position of the purine group. Thus the term "purine base" is inclusive of the nitrogen analogs, i.e. members of the 7-deazapurine, 8-azapurine, 2-azapurine and 8-aza-9-deazapurine series. More specifically, the purine bases include hypoxanthin-9-yl, 7-deazaadenin-9-yl, 7-deazaguanin-9-yl, adenin-9-yl, 6-methylaminopurin-9-yl, 6-dimethylaminopurin-9-yl, 6-chloropurin-9-yl, 2-amino-6-chloropurin-9-yl, 6-mercaptopurin-9-yl, 6-methylmercaptopurin-9-yl, guanin-9-yl, xanthin-9-yl, 2,6-dichloropurin-9-yl, 2,6-diaminopurin-9-yl, 2,6-di(methylamino)purin-9-yl, 2,6-azaadenin-9-yl, thioguanin-9-yl, 2-fluoroadenin-9-yl, 6-hydroxylaminopurin-9-yl, 8-azaguanin-9-yl, 2-azaadenin-9-yl, and 2-amino-6-methylmercaptopurin-9-yl. The 8-aza-9-deazapurines include the 8-aza-9-deazaadenin-9-yl group (also known as a 7-aminopyrazolo[4.3.d]pyrimidin-9-yl group) and the 8-aza-9-deazahypoxanthin-9-yl group (also known as a 7-hydroxypyrazolo[4.3.d]pyrimidin-3-yl group).

The terms "hydrolyzable acyloxy groups" and "hydrolyzable acyl derivatives," as used herein, refers to those esters and acyl derivatives conventionally employed in the nucleoside and nucleotide art, preferably those derived from carboxylic acids of one to 12 carbon atoms. Typical hydrolyzable acyl groups thus include acetyl, propionyl, butyryl, valeryl, isovaleryl, hexanoyl, heptanoyl, octanoyl, nonanoyl, undecanoyl, lauroyl, benzoyl, p-methoxybenzoyl, p-nitrobenzoyl, phenylacetyl, phenylpropionyl, o-, m-, p-methylbenzoyl, β-cyclopentylpropionyl, dihydrocinnanyl and the like.

The term "lower alkyl" refers to a straight or branched chain aliphatic hydrocarbon group containing less than 8 carbon atoms, inclusive, such as methyl, ethyl, isopropyl, n-butyl, s-butyl, hexyl and the like. By the term "aryl" is meant a group containing one aromatic ring such as phenyl preferably having up to 10 carbons. By the term "alkaryl" is meant a substituted phenyl group having one or more alkyl substitutents and having up to 10 carbon atoms such as o-tolyl, m-tolyl, p-isopropylphenyl, 2,3-dimethylphenyl, 3,5-dimethylphenyl, and the like. By the term "aralkyl" is meant a phenyl substituted alkyl group such as benzyl, phenylethyl, o-, m-, or p-methylbenzyl, and the like preferably having up to 10 carbons. By the term "cycloalkyl" is meant a cyclic aliphatic hydrocarbon group containing 3 to 8 carbons such as cyclopropyl, cyclobutyl, cyclopentyl, cyclohexyl, cycloheptyl, and the like.

The compounds of this invention exhibit antimetabolic properties and are accordingly useful in producing metabolic deficiencies in biological systems as, for example, in the growth of various microorganisms and similar undesirable systems. For example, the compounds of Formulas A, A1, B and B1 inhibit the growth of *Shigella paradysenteriae*, *Streptococcus faecalis*, and the like and show inhibition of viruses such as vaccinia virus in tissue culture and of various mammalian cell lines in tissue culture (e.g. He La cells). The compounds of Formulas C and C1 have the activity and can be used in the same manner for the same purposes as the known antibiotic cordycepin. Other uses are described in U.S. Pat. 3,346,560 which discloses some of these compounds. Naturally occurring compounds of Formula D1 are useful in RNA synthesis. Other compounds of Formulas D and D1 are useful for the same purposes and in the same manner as formycin and the tubercidins. The compounds of Formula E are useful as intermediates for producing the corresponding known 9-(β-D-arabinofuranosyl)-purines having known uses such as inhibiting or controlling metabolic processes and producing metabolic deficiencies in biological systems. The compounds of Formula E can be hydrolyzed with 0.1 N NaOH for one hour at 100° C. followed by conventional chromatography to yield the corresponding 9-(β-D-arabinofuranosyl)-purines.

Compounds of Formulas A, A1, B, B1, C, C1, D and D1 are prepared by processes which can be illustrated as follows:

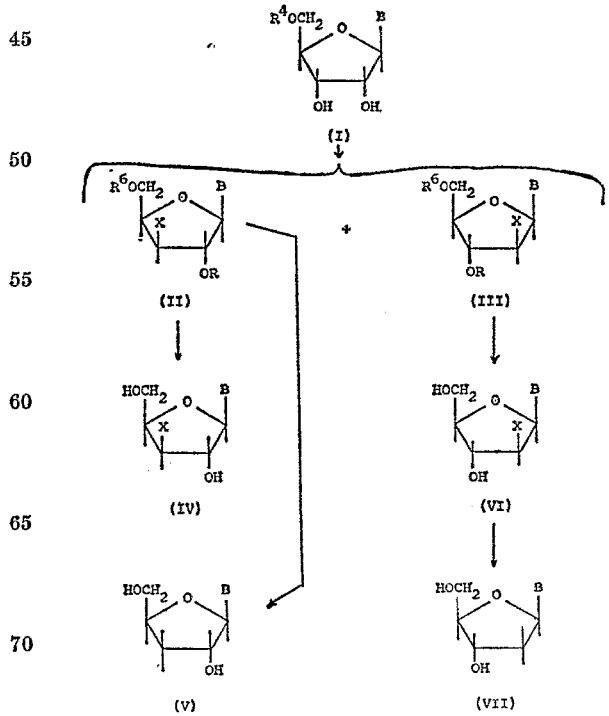

In the above formulas, $R^4$ is hydrogen or a conventional hydrolyzable acyl group;

OR[5] is an acyloxy group corresponding to the α-acyloxy group of the α-acyloxy acyl halide reactant;

R[6] corresponds to the acyl group of R[4] or an acyl group derived from the α-acyloxy acyl halide reactant with which the compound of Formula I is reacted; and B and X are as previously defined.

The compounds of Formulas II and III are prepared by reacting the 9-(β-D-ribofuranosyl)-purines of Formula I with an α-acyloxy halide having the formula:

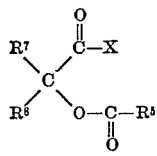

VIII

In the above formula, R[5], R[7], R[8] and X are as previously defined.

The reaction is conducted with the heat reagents or in an inert organic solvent such as nitromethane, glacial acetic acid, chloroform, ethyl acetate, 1,2-dimethoxyethane, benzene, dimethylformamide, butyrolactone, acetonitrile and the like (preferably dry acetonitrile) at a temperature of about 20 to 150° C., preferably at the lower temperatures, for a period of 15 minutes to 8 hours or more until the reaction is substantially complete.

A mixture of compounds of Formulas II and III are prepared by this procedure. The individual compounds can be separated by conventional chromatography.

The compounds of Formula IV are prepared by hydrolyzing the compounds of Formula II with a mineral or strong organic acid, preferably a mineral acid such as hydrochloric acid in methanol at a temperature of from 0° to 50°C., preferably about 25° C. for from 8 hours to 30 days, preferably for 8 to 10 days.

The dehalogenated compounds of Formula V are prepared by hydrogenolyzing the compounds of Formula II (not containing sulfur in the purine group) with a conventional hydrogenation catalyst such as palladium, platinum or Raney nickel. Preferably palladium-on-barium sulfate is used in a suitable polar organic solvent such as a lower alkanol (e.g., methanol), preferably in the presence of an amine base such as triethylamine, pyridine and the like or a suitable buffer such as sodium acetate. The hydrogenolyzed product can be deacylated by reacting it with an alkali metal alkylate in the corresponding alcohol such as with sodium methoxide, in methanol with sodium ethoxide in ethanol and the like. It can also be deacylated in a lower alcoholic solvent with concentrated aqueous ammonium hydroxide at a temperature of about 20° C. to the reflux temperature of the lower alcohol solvent, preferably at the lower temperatures, for a period of 15 minutes to 4 hours.

The 6-mercaptopurine and thioguanine compounds of Formula V can be prepared by reacting the corresponding 6-chloropurine and 2-amino-6-chloropurine compounds with thiourea in absolute ethanol at reflux for about one hour. The 6-methylmercaptopurine and 2-amino-6-methylmercaptopurine compounds of Formula V are prepared by reacting the corresponding mercapto compounds with methyl iodide in absolute ethanol at room temperature for about four hours while a dilute methanolic sodium hydroxide solution is added to maintain a pH of about 8.

The 6-hydroxylaminopurines of Formula V can be prepared by reacting the corresponding 6-chloropurine compounds with hydroxylamine in ethanol at a temperature of 50° C. for 2 to 12 hours.

The deacylated compounds of Formula VI are prepared by hydrolyzing the compounds of Formula III such as by reacting them with a lower alcohol solvent containing concentrated aqueous ammonium hydroxide for from about 15 minutes to 4 hours at from 20° C. to the reflux temperature of the solvent.

The dehalogenated compounds of Formula VII are prepared by hydrogenolysis of the compounds of Formula VI (not containing sulfur in the purine groups) as described for preparing the compounds of Formula V. The 6-mercaptopurine, 6-methylmercaptopurine, thioguanine, and 2-amino-6-methylmercaptopurine compounds of Formula VII can be prepared from the corresponding 6-chloropurine and 2-amino-6-chloropurine compounds of Formula VI as described for preparing the compounds of Formula V. Likewise, the 6-hydroxylaminopurine compounds of Formula VII can be prepared from the corresponding 6-chloropurine compounds of Formula VI as described for preparing the compounds of Formula V.

The compounds of Formula E are prepared by a procedure which can be represented as follows:

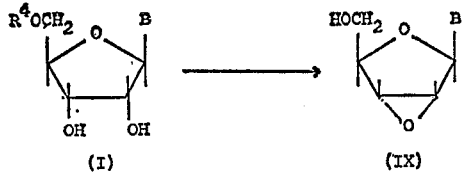

In the above formulas R[4] and B are as previously defined.

In the above procedure, the compounds of Formula I are reacted with an α-acyloxy acyl halide of Formula VIII as described for preparing the compounds of Formulas II and III. The reaction products are then separated from the mixture such as by conventional procedures as previously described and treated in a lower alcohol solvent with a corresponding alkali metal alkylate such as with sodium methoxide in methanol or with potassium ethoxide in ethanol and the like, at a temperature of from −10 to 25° C., preferably 0° C. for from 1 to 36 hours, preferably about 16 hours to yield the 2′,3′-anhydro nucleosides of Formula IX.

The acylated compounds of this invention can be prepared by conventional procedures from the corresponding free hydroxy or free amino compounds. Examples of suitable acylation procedures include reacting the free hydroxy compounds with the corresponding acid anhydride or acid chloride in a suitable organic solvent.

The α-acyloxy acyl halides of Formula VIII can be prepared by procedures described in application Ser. No. 610,771 filed Jan. 23, 1967, now Pat. No. 3,539,550. As described in that application, the α-acyloxy free acids are prepared by acylating the α-hydroxy free acid by treatment with an acid chloride of the formula

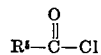

(wherein R[5] is as previously defined) either alone or in a nonreacting organic solvent such as benzene, toluene or the like, which may optionally contain a base such as pyridine, trimethylamine, N,N-dimethylaniline or the like.

For the preparation of the α-acyloxy acyl chloride, the corresponding α-acyloxy free acid is allowed to react with thionyl chloride or oxalyl chloride in an inert halogenated solvent such as methylene chloride, chloroform, and the like, at a temperature of about 25° C. for a period of from 1 to 12 hours. In an alternate method, the free acid is treated with triphenylphosphine in carbon tetrachloride at a temperature of about 25° C. for a period of from about 1 to about 12 hours, and preferably for the longer times.

For the preparation of the α-acyloxy acyl bromides, the corresponding α-acyloxy free acid is allowed to react with an excess of phosphorous tribromide at reflux temperature for a period of about 4 hours. In an alternative method, the α-acyloxy acyl chloride is allowed to react with an alkali metal bromide preferably lithium bromide, or an alkylammonium bromide, such as tetramethylammonium bromide, tetraethylammonium bromide, and the like, but preferably with the alkali metal bromide. The reaction is conducted in an inert solvent such as ethyl acetate, dioxane and the like, at a temperature of about 25° C. for a period of about one half hour.

Among the α-hydroxy acids which can be used to prepare the α-acyloxy acyl halides of Formula VIII by the methods described above are lactic acid analogs such as 2-methyl lactic acid, atrolactic acid, 2-hydroxy-2-methylbutyric acid, 2-hydroxy-2-methylvaleric acid, 2-hydroxy-2-ethylbutyric acid, 2-hydroxy-2-methylhexanoic acid, 2,3-diphenyllactic acid, 2-methyl-3-phenyllactic acid; mandelic acid and its analogs such as α-ethylmandelic acid, α-propylmandelic acid, α-isopropylmandelic acid, α-butylmandelic acid, α-isobutylmandelic acid, α-s-butylmandelic acid, α-isopentylmandelic acid, α-hexylmandelic acid, m-methylmandelic acid, p-isopropylmandelic acid, α-cyclopropylmandelic acid, α-cyclobutylmandelic acid, α-cyclopentylmandelic acid, α-cyclohexylmandelic acid, and the like; benzilic acid and its analogs such as 3-methylbenzilic acid, 4-methylbenzilic acid, 2,3-dimethylbenzilic acid, 2,4-dimethylbenzilic acid, 2,5 - dimethylbenzilic acid, 2,6-dimethylbenzilic acid, 3,4-dimethylbenzilic acid, 3,5-dimethylbenzilic acid, 2,2'-dimethylbenzilic acid, 3,3'-dimethylbenzilic acid, 4,4'-dimethylbenzilic acid, 2,3,4,6-tetramethylbenzilic acid, 2,3,5,6-tetramethylbenzilic acid, 3,3',4,4'-tetramethylbenzilic acid, 3,3',5,5'-tetramethylbenzilic acid and the like.

EXAMPLE 1

9-(2-O-acetyl-3-bromo-3-deoxy-5-O-[2,4,4-trimethyldioxolan-5-on-2-yl]-β-D-xylofuranosyl)-adenine To a suspension of adenosine (1.33 g., 5 mmole) in dry acetonitrile (50 ml.) is added α-acetoxyisobutyryl bromide (4.18 g., 20 mmole), and the mixture is stirred at room temperature for 1.5 hours. The solvent is removed in vacuo, and the product is partitioned between aqueous sodium bicarbonate solution and ethyl acetate. The aqueous extract is washed well with ethyl acetate. The ethyl acetate extracts are combined, washed with water, dried over sodium sulfate and evaporated in vacuo to dryness. The residue is dissolved in ethanol (20 ml.) with warming. On storing at 0° C. overnight, 0.76 g. of the product, 9 - (2 - O-acetyl-3-bromo-3-deoxy-5-O-[2,4,4-trimethyldioxolan-5-on-2-yl]-β-D-xylofuranosyl)-adenine crystallizes.

EXAMPLE 2

9-(3-bromo-3-deoxy-β-D-xylofuranosyl)-adenine

The product of Example 1 (500.3 mg., 1 mmole) is dissolved with stirring in a solution of concentrated hydrochloric acid, (0.2 ml.) in methanol (19 ml.), and the solution is left at room temperature for 14 days. Silver carbonate (1 g.) is added to the solution, and the mixture is stirred vigorously for 2 hours. The mixture is filtered through Celite, and the residue is washed well with methanol. The filtrate is evaporated to dryness, and the product 9 - (3 - bromo-3-deoxy-β-D-xylofuranosyl)-adenine is recrystallized from methanol-acetone.

EXAMPLE 3

9-(2-bromo-2-deoxy-β-D-arabinofuranosyl)-adenine

The procedure of Example 1 is repeated and 9-(2-O-acetyl - 3-bromo-3-deoxy-5-O-[2,4,4-trimethyldioxolan-5-on - 2 - yl]-β-D-xylofuranosyl)-adenine is separated by crystallization. The solvent is removed from the mother liquor in vacuo, and the product is dissolved in methanol (45 ml.) containing concentrated ammonium hydroxide solution (5 ml.). The mixture is stored at room temperature for 48 hours. The solvent is removed in vacuo, and the residual oil is chromatographed on silicic acid using mixtures of chloroform and methanol giving first some 2',3'-anhydroadenosine and then 9-(2-bromo-2-deoxy-β-D-arabinofuranosyl)-adenine, both of which can be crystallized from ethanol.

EXAMPLE 4

9-(2-O-acetyl-3-chloro-3-deoxy-5-O-[2,4,4-trimethyldioxolan-5-on-2-yl]-β-D-xylofuranosyl)adenine To a suspension of adenosine (1.33 g., 5 mmole) and dry acetonitrile (50 ml.) is added α-acetoxyisobutyryl chloride (3.3 g., 20 mmole), and the mixture is stirred at 80° C. for 1 hour. The mixture is cooled, and the solvent is removed in vacuo. The product is partitioned between ethyl acetate and aqueous sodium bicarbonate solution. The aqueous layer is extracted well with ethyl acetate, the combined ethyl acetate fractions are washed with water, dried over sodium sulfate and evaporated in vacuo to dryness. The residue is triturated with methanol (10 ml.) and the product 9-(2-O-acetyl-3-chloro-3-deoxy-5-O-[2,4,4 - trimethyldioxolan-5-on-2-yl]-β-D-xylofuranosyl)-adenine is crystallized from the mixture.

EXAMPLE 5

9-(3-chloro-3-deoxy-β-D-xylofuranosyl)-adenine

The product of Example 4 (2.28 g., 5 mmole) is dissolved in methanol (99 ml.) and concentrated hydrochloric acid (1 ml.) is added to the solution. The mixture is stored at room temperature for 8 days. Silver carbonate (5 g.) is added to the solution, and the resulting mixture is stirred vigorously for 2 hours. The mixture is filtered through Celite, and the residue washed well with methanol. The filtrate is evaporated to dryness in vacuo. The product is dissolved in ethanol/acetone and stored at 0° C. until the product 9 - (3 - chloro-3-deoxy-β-D-xylofuranosyl)-adenine crystallizes.

EXAMPLE 6

9-(2-chloro-2-deoxy-β-D-arabinofuranosyl)-adenine

The procedure of Example 4 is repeated and 9-(2-O-acetyl-3-chloro-3-deoxy-5-O-[2,4,4 - trimethyldioxolan - 5-on-2-yl]-β-D-xylofuranosyl)-adenine is separated by crystallization. The solvent is removed from the mother liquors in vacuo, the product is dissolved in methanol (45 ml.) containing concentrated ammonium hydroxide solution (5 ml.), and the mixture is stored at room temperature for 48 hours. The solvent is removed in vacuo, and the residual foam dissolved in a minimum quantity of hot methanol. The product 9-(2-chloro-2-deoxy-β-D-arabinofuranosyl)-adenine crystallizes on storage of the solution at 0° C. overnight. Chromatography of the mother liquors on silicic acid gives a further amount of this product as well as some 2',3'-anhydroadenosine.

EXAMPLE 7

9-(3-bromo-3-deoxy-β-D-xylofuranosyl)-purines

Repeating the procedures of Examples 1 and 2 but replacing adenosine with other 9-(β-D-ribofuranosyl)-purines wherein the purine group is hypoxanthin-9-yl,
7-deazaadenin-9-yl,
7-deazaguanin-9-yl,
6-methylaminopurin-9-yl,
6-dimethylaminopurin-9-yl,
6-chloropurin-9-yl,
2-amino-6-chloropurin-9-yl,
6-mercaptopurin-9-yl,
6-methylmercaptopurin-9-yl,
guanin-9-yl,
xanthin-9-yl,
2,6-dichloropurin-9-yl,
2,6-diaminopurin-9-yl,
2,6-di(methylamino)purin-9-yl,
8-azaadenin-9-yl,
2-azaadenin-9-yl,
thioguanin-9-yl,
2-fluoroadenin-9-yl, EXAMPLE 7.—Continued 6-hydroxyaminopurin-9-yl,
8-azaguanin-9-yl,
2-amino-6-methylmercaptopurin-9-yl,
8-aza-9-deazaadenin-9-yl or
8-aza-9-deazahypoxanthin-9-yl yields the corresponding 9-(3-bromo-3-deoxy-β-D-xylofuranosyl)-purines.

EXAMPLE 8

9-(2-bromo-2-deoxy-β-D-arabinofuranosyl)-purines

Repeating the procedure of Example 3 but replacing adenosine with 9-(β-D-ribofuranosyl)-purines wherein the purine groups are hypoxanthin-9-yl,
7-deazaadenin-9-yl,
7-deazaguanin-9-yl,
6-methylaminopurin-9-yl,
6-dimethylaminopurin-9-yl,
6-chloropurin-9-yl,
2-amino-6-chloropurin-9-yl,
6-mercaptopurin-9-yl,
6-methylmercaptopurin-9-yl,
guanin-9-yl,
xanthin-9-yl,
2,6-dichloropurin-9-yl,
2,6-diaminopurin-9-yl,
2,6-di(methylamino)purin-9-yl,
8-azaadenin-9-yl,
2-azaadenin-9-yl,
thioguanin-9-yl,
2-fluoroadenin-9-yl,
6-hydroxyaminopurin-9-yl,
8-azaguanin-9-yl,
2-amino-6-methylmercaptopurin-9-yl,
8-aza-9-deazaadenin-9-yl and
8-aza-9-deazahypoxanthin-9-yl yields the corresponding 9 - (2-bromo-2-deoxy-β-D-arabinofuranosyl)-purines.

EXAMPLE 9

9-(3-chloro-3-deoxy-β-D-xylofuranosyl)-purines

Repeating the procedure of Examples 4 and 5 but replacing adenosine with 9-(β-D-xylofuranosyl)-purines wherein the purine groups are hypoxanthin-9-yl,
7-deazaadenin-9-yl,
7-deazaguanin-9-yl,
6-methylaminopurin-9-yl,
6-dimethylaminopurin-9-yl,
6-chloropurin-9-yl,
2-amino-6-chloropurin-9-yl,
6-mercaptopurin-9-yl,
6-methylmercaptopurin-9-yl,
guanin-9-yl,
xanthin-9-yl,
2,6-dichloropurin-9-yl,
2,6-diaminopurin-9-yl,
2,6-di(methylamino)-purin-9-yl,
8-azaadenin-9-yl,
thioguanin-9-yl,
2-fluoroadenin-9-yl,
6-hydroxyaminopurin-9-yl,
8-azaguanin-9-yl,
2-azaadenin-9-yl,
2-amino-6-methylmercaptopurin-9-yl,
8-aza-9-deazaadenin-9-yl and
8-aza-9-deazahypoxanthin-9-yl yields the corresponding 9-(3-chloro-3-deoxy-β-D-xylofuranosyl)-purines.

EXAMPLE 10

9-(2-chloro-2-deoxy-β-D-arabinofuranosyl)-purines

Repeating the procedure of Example 6 but replacing adenosine with 9-(β-D-ribofuranosyl)-purines wherein the purine groups are hypoxanthin-9-yl,
7-deazaadenin-9-yl,
7-deazaguanin-9-yl,
6-methylaminopurin-9-yl,
6-dimethylaminopurin-9-yl,
6-chloropurin-9-yl,
2-amino-6-chloropurin-9-yl,
6-mercaptopurin-9-yl,
6-methylmercaptopurin-9-yl,
guanin-9-yl,
xanthin-9-yl,
2,6-dichloropurin-9-yl,
2,6-diaminopurin-9-yl,
2,6-di(methylamino)purin-9-yl,
8-azaadenin-9-yl,
thioguanin-9-yl,
2-fluoroadenin-9-yl,
6-hydroxyaminopurin-9-1yl,
8-azaguanin-9-yl,
2-azaadenin-9-yl,
2-amino-6-methylmercaptopurin-9-yl,
8-aza-9-deazaadenin-9-yl and
8-aza-9-deazahypoxanthin-9-yl yields the corresponding 9-(2-chloro-2-deoxy-β-D-arabinofuranosyl)-purines.

EXAMPLE 11

9-(3-deoxy-β-D-ribofuranosyl)-adenine

To a solution of the product of Example 1 (500 mg., 1 mmole) in methanol (5 ml.) containing triethylamine (0.2 ml. is added palladium-on-barium sulfate (5%, 300 mg.), and the resulting mixture is hydrogenolyzed at atmospheric pressure for 24 hours. The catalyst is removed by centrifugation, washed with methanol and the combined methanol fractions are evaporated to dryness in vacuo. The product is dissolved in dry methanol (10 ml.), and sodium metal (0.5 g.) is added. Preparative thin layer chromatography on silica gel yields the product 9-(3-deoxy-β-D-ribofuranosyl)-adenine which is recrystallized from water.

EXAMPLE 12

9-(3-deoxy-β-D-ribofuranosyl)-purines

Repeating the procedure of Example 11 with the acylated 3'-bromo intermediates of Example 7 yields the corresponding 9 - (3 - deoxy-β-D-ribofuranosyl)-purines wherein the purine bases include hypoxanthin-9-yl, 7-deazaadenin-9-yl, 7 - deazaguanin-9-yl, 6 - methylaminopurin-9-yl, 6-methylaminopurin-9-yl, 6-chloropurin-9-yl, 2-amino-6-chloropurin-9-yl, guanin-9-yl, xanthin-9-yl, 2,6-dichloropurin-9-yl, 2,6-diaminopurin-9-yl, 2,6-di(methylamino)-purin-9-yl, 8 - azaadenin-9-yl, 2 - azaadenin-9-yl, thioguanin-9-yl, 2-fluoroadenin-9-yl, 8-azaguanin-9-yl, 8-aza-9-deazaadenin-9-yl, and 8-aza-9-deazahypoxanthin-9-yl groups.

EXAMPLE 13

9-(3-deoxy-β-D-ribofuranosyl)-6-mercaptopurin and 6-thioguanine

6 - chloro - 9-(3-deoxy-β-D-ribofuranosyl)-purine (300 mg.) and 100 mg. of thiourea are dissolved in absolute ethanol (8 ml.) and heated under reflux for one hour. The mixture is evaporated to dryness and purified by chromatography on silicic acid to give 9-(3-deoxy-β-D-ribofuranosyl)-6-mercaptopurine.

Repeating the above procedure with 2-acetamido-6-chloro-9-(3-deoxy-β-D-ribofuranosyl)-purine followed by treatment under nitrogen with concentrated ammonium hydroxide prior to chromatography yields the corresponding 9-(3-deoxy-β-D-ribofuranosyl)-6-thioguanine.

EXAMPLE 14

9-(3-deoxy-β-D-ribofuranosyl)-6-methylmercaptopurine and 2-amino-6-methylmercaptopurine Methyl iodide (1 ml.) and 9-(3-deoxy-β-D-ribofuranosyl)-6-mercaptopurine (300 mg.) is dissolved in ethanol (10 ml.), and the mixture is stirred at room temperature for 4 hours while dilute methanolic sodium hydroxide is added to maintain a slightly alkaline pH. The solvent is then evaporated, and the residue is purified by chromatography to yield 9-(3-deoxy-β-D-ribofuranosyl)-6-methylmercaptopurine.

Repeating the procedure with 9-(3-deoxy-β-D-ribofuranosyl)-6-thioguanine yields the corresponding 2-amino-9-(3-deoxy-β-D-ribofuranosyl)-6-methylmercaptopurine.

EXAMPLE 15

9-(3-deoxy-β-D-ribofuranosyl)-6-hydroxylaminopurine 9-(3-deoxy-β-D-ribofuranosyl)-6-chloropurine (338 mg.) is dissolved in 10 ml. of a 0.5 M ethanolic solution of hydroxylamine (prepared as in J. Amer. Chem. Soc. 80, 3932) and kept at 50° C. for 6 hours. The mixture is then evaporated and purified by chromatography on silicic acid to yield 9-(3-deoxy-β-D-ribofuranosyl)-6-hydroxylaminopurine.

EXAMPLE 16

2',3'-anhydroadenosine

To a suspension of adenosine (1.33 g., 5 mmole) and dry acetonitrile is added α-acetoxyisobutyryl bromide (4.18 g., 20 mmole) and the mixture is stirred at room temperature for 1.5 hours. The solvent is removed in vacuo, and the product is partitioned between aqueous sodium bicarbonate solution and ethyl acetate. The ethyl acetate extracts are combined, washed with water, dried over sodium sulfate and evaporated in vacuo to dryness. The residue is dissolved in dry methanol (20 ml.) and sodium metal (1.5 g.) is added. The mixture is stored overnight at 0° C. when the product 2',3'-anhydroadenosine crystallizes.

EXAMPLE 17

9-(2,3-anhydro-β-D-ribofuranosyl)-purines

Repeating the procedure of Example 16 but replacing adenosine with other 9-(β-D-ribofuranosyl)-purines wherein the purine groups include
hypoxanthin-9-yl,
7-deazaadenin-9-yl,
7-deazaguanin-9-yl,
6-methylaminopurin-9-yl,
6-dimethylaminopurin-9-yl,
6-chloropurin-9-yl,
2-amino-6-chloropurin-9-yl,
6-mercaptopurin-9-yl,
6-methylmercaptopurin-9-yl,
guanin-9-yl,
xanthin-9-yl,
2,6-dichloropurin-9-yl,
2,6-diaminopurin-9-yl,
2,6-di(methylamino)-purin-9-yl,
8-azaadenin-9-yl,
thioguanin-9-yl,
2-fluoroadenin-9-yl,
6-hydroxyaminopurin-9-yl,
8-azaguanin-9-yl,
2-azaadenin-9-yl,
2-amino-6-methylmercaptopurin-9-yl,
8-aza-9-deazaadenin-9-yl and
8-aza-9-deazahypoxanthin-9-yl yields the corresponding 9-(2,3-anhydro-β-D-ribofuranosyl)-purines.

EXAMPLE 18

2'-deoxyadenosine

A solution of 9-(2-bromo-2-deoxy-β-D-arabinofuranosyl)-adenine (500 mg.) in methanol (50 ml.) containing triethylamine (0.2 ml.) is vigorously stirred with a 5% palladium-on-barium sulfate catalyst (300 mg.) in an atmosphere of hydrogen for 24 hours. After removal of the catalyst by centrifugation, the solvent is evaporated to dryness and the residue is purified by chromatography on silicic acid giving 2'-deoxyadenosine which is crystallized from water.

EXAMPLE 19

9-(2'-deoxy-β-D-ribofuranosyl)-purines

The procedure of Example 18 is repeated replacing 9-(2-bromo-2-deoxy-β-D-arabinofuranosyl)-adenine with 9-(2-bromo-2-deoxy-β-D-arabinofuranosyl)-purines in which the purine groups are hypoxanthin-9-yl,
7-deazaadenin-9-yl,
7-deazaguanin-9-yl,
6-methylaminopurin-9-yl,
6-dimethylaminopurin-9-yl,
6-chloropurin-9-yl,
2-amino-6-chloropurin-9-yl,
guanin-9-yl,
xanthin-9-yl,
2,6-dichloropurin-9-yl,
2,6-diaminopurin-9-yl,
2,6-di(methylamino)-purin-9-yl,
8-azaadenin-9-yl,
2-fluoroadenin-9-yl,
8-azaguanin-9-yl,
2-azaadenin-9-yl,
8-aza-9-deazaadenin-9-yl and
8-aza-9-deazahypoxanthin-9-yl yields the corresponding 9-(2-deoxy-β-D-ribofuranosyl)-purines.

EXAMPLE 20

9-(2-deoxy-β-D-ribofuranosyl)-6-mercaptopurine and 6-thioguanine

Repeating the procedure of Example 13 with 6-chloro-9-(2-deoxy-β-D-ribofuranosyl)-purine and 2-acetamido-6-chloro-9-(2-deoxy-β-D-ribofuranosyl)-purine yields the corresponding 9-(2-deoxy-β-D-ribofuranosyl)-6-mercaptopurine and 9-(2-deoxy-β-D-ribofuranosyl)-6-thioguanine.

EXAMPLE 21

9-(2-deoxy-β-D-ribofuranosyl)-6-methylmercaptopurine and 2-amino-6-methylmercaptopurine Repeating the procedure of Example 14 with the products of Example 20 yields the corresponding 9-(2-deoxy-β-D-ribofuranosyl)-6-methylmercaptopurine, and 2-amino-9-(2-deoxy-β-D-ribofuranosyl)-6-methylmercaptopurine.

We claim:

1. A compound selected from the group of compounds represented by the formulas:

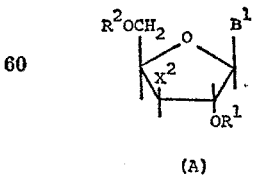   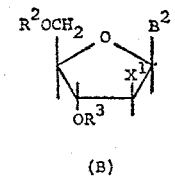

(A)                (B)

wherein
$R^1$, $R^2$ and $R^3$ each is hydrogen or a hydrolyzable acyl group derived from a carboxylic acid having from one to 12 carbons;
$B^1$ and $B^2$ each is a purine base attached to the furanose moiety through the 9-position or a hydrolyzable acyl derivative thereof derived from a carbocyclic acid having from one to 12 carbons, but $B^2$ does not include adenin-9-yl when $X^1$ is chloro, and
$X^1$ and $X^2$ each is chloro or bromo.

2. A compound of claim 1 selected from the group of compounds represented by Formula A.

3. A compound of claim 2 wherein $R^1$ and $R^2$ are hydrogen.

4. A compound of claim 1 selected from the group of compounds represented by Formula B.

5. A compound of claim 4 wherein $R^2$ and $R^3$ are hydrogen.

6. A process for producing a compound selected from the group of compounds having the formulas:

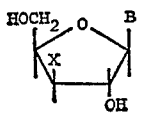 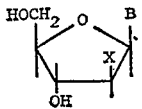

(A1) (A2)

wherein

B is a purine base attached to the furanose moiety through the 9-position and

X is chloro or bromo;

comprising reacting in an inert organic solvent a 9-($\beta$-D-ribofuranosyl)-purine with an $\alpha$-acyloxy acyl halide having the formula:

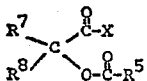

(VIII)

wherein $R^5$ is hydrogen; lower alkyl; or aryl, alkaryl or aralkyl having up to 10 carbons;

$R^7$ is hydrogen; lower alkyl; cycloalkyl having from 3 to 8 carbons; or aryl, alkyl, or aralkyl having up to 10 carbons; and $R^8$ is lower alkyl or aryl, alkaryl, or aralkyl having up to 10 carbons—$R^8$ being aryl, alkaryl or aralkyl when $R^7$ is hydrogen;

and deacylating the reaction products by hydrolysis.

7. A compound selected from the group of compounds represented by the formulas:

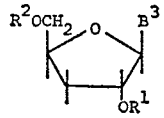 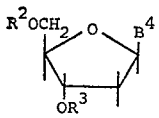

(C) (D)

wherein $R^1$, $R^2$ and $R^3$ each is hydrogen or a hydrolyzable acyl group derived from a carboxylic acid having from one to 12 carbons;

$B^3$ is 7-deazaadenin-9-yl, 7-deazaguanin-9-yl, xanthin-9-yl, 2,6-dichloropurin-9-yl, 2-fluoroadenin-9-yl, 2-azaadenin-9-yl, 8-aza-9-deazaadenin-9-yl or 8-aza-9-deazahypoxanthin-9-yl or a conventional hydrolyzable acyl derivative thereof; and $B^4$ is 2-azaadenin-9-yl, 7-deazaadenin-9-yl, 8-aza-9-deazaadenin-9-yl or 8-aza-9-deazahypoxanthin-9-yl, but when $B^4$ is 2-azaadenin-9-yl, $R^2$ and $R^3$ are hydrogen.

8. A compound of claim 7 selected from the group of compounds represented by Formula C.

9. A compound of claim 8 wherein $R^1$ and $R^2$ are hydrogen.

10. A compound of claim 7 selected from the group of compounds represented by Formula D.

11. A compound of claim 10 wherein $R^2$ and $R^3$ are hydrogen.

12. A process for preparing compounds selected from the group of compounds represented by the formula:

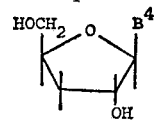

(C1)

wherein $B^4$ is a purine base attached to the furanose moiety through the 9-position comprising reacting a 9-($\beta$-D-ribofuranosyl)-purine with an $\alpha$-acyloxy acyl halide in an inert organic solvent to yield the corresponding 9-(2 - O - acyloxy - 3 - deoxy - 3-halo-$\beta$-D-xylofuranosyl)-purine, dehalogenating the product by hydrogenolysis in the presence of a hydrogenation catalyst, and deacylating the dehalogenated product by hydrolysis, the $\alpha$-acyloxy acyl halide being selected from the group of compounds having the formula:

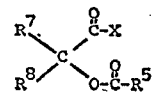

(VIII)

wherein

X is chloro or bromo;

$R^5$ is hydrogen; lower alkyl; or aryl, alkaryl or aralkyl having up to 10 carbons;

$R^7$ is hydrogen; lower alkyl; cycloalkyl having from 3 to 8 carbons; or aryl, alkyl, or aralkyl having up to 10 carbons; and $R^8$ is lower alkyl or aryl, alkaryl, or aralkyl having up to 10 carbons—$R^8$ being aryl, alkaryl or aralkyl when $R^7$ is hydrogen.

13. A process for producing compounds selected from the group of compounds represented by the formula:

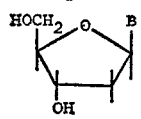

(D1)

wherein B is a purine base attached to the furanose moiety through the 9-position comprising reacting 9-($\beta$-D-ribofuranosyl)-purine with an $\alpha$-acyloxy acyl halide in an inert organic solvent, hydrolyzing the reaction products to yield purine, and dehalogenating the product by hydrogenolysis in the presence of a hydrogenation catalyst, the $\alpha$-acyloxy acyl halide having the formula

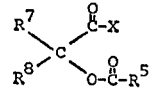

(VIII)

wherein

X is chloro or bromo;

$R^5$ is hydrogen; lower alkyl; or aryl, alkaryl or aralkyl having up to 10 carbons;

$R^7$ is hydrogen; lower alkyl; cycloalkyl having from 3 to 8 carbons; or aryl, alkyl, or aralkyl having up to 10 carbons; and $R^8$ is lower alkyl or aryl, alkaryl, or aralkyl having up to 10 carbons—$R^8$ being aryl, alkaryl or aralkyl when $R^7$ is hydrogen.

14. A compound selected from the group of compounds represented by the formula:

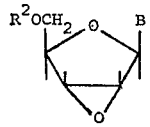

(E)

wherein
R² is hydrogen or a conventional hydrolyzable acyl group derived from a carboxylic acid having from one to 12 carbons; and
B is a purine base attached to the furanose moiety through the 9-position or a conventional hydrolyzable derivative thereof but not including adenin-9-yl and 6-dimethylaminoadenin-9-yl.

15. A compound of claim 14 wherein R² is hydrogen.

16. A process for preparing a compound selected from the group of compounds represented by the formula:

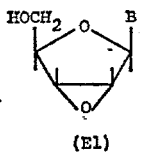

(E1)

wherein B is a purine base attached to the furanose moiety through the 9-position or a hydrolyzable acyl derivative thereof derived from a carboxylic acid having from one to 12 carbons,
comprising reacting a 9-(β-D-ribofuranosyl)-purine with an α-acyloxy acyl halide in an inert organic solvent to form the corresponding acylated 9-(3-deoxy-3-halo-β-D-xylofuranosyl)-purine and 9-(2-deoxy-2-halo-β-D-arabinofuranosyl)-purine and dehalogenating the products with an alkali metal alkoxide in an alcoholic solvent, the α-acyloxy acyl halide having

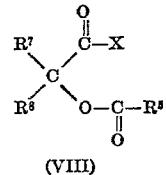

(VIII)

wherein
X is chloro or bromo;
R⁵ is hydrogen; lower alkyl; or aryl, alkaryl or aralkyl having up to 10 carbons;
R⁷ is hydrogen; lower alkyl; cycloalkyl having from 3 to 8 carbons; or aryl, alkyl, or aralkyl having up to 10 carbons; and
R⁸ is lower alkyl or aryl, alkaryl, or aralkyl having up to 10 carbons—R⁸ being aryl, alkaryl or aralkyl when R⁷ is hydrogen.

References Cited
UNITED STATES PATENTS 3,269,917  8/1966   Imada et al. _____ 260—211.5
3,346,560  10/1967  Boxer _____ 260—211.5
3,539,550  11/1970  Greenberg et al. __ 260—211.5 R LEWIS GOTTS, Primary Examiner
J. R. BROWN, Assistant Examiner U.S. Cl. X.R.
424—180